Oct. 31, 1967  G. C. BERGER  3,349,929
SILAGE DISTRIBUTOR
Filed Oct. 22, 1965

INVENTOR.
GEORGE C. BERGER
BY
Williamson & Palmatier
ATTORNEYS

Oct. 31, 1967 G. C. BERGER 3,349,929
SILAGE DISTRIBUTOR
Filed Oct. 22, 1965 2 Sheets-Sheet 2
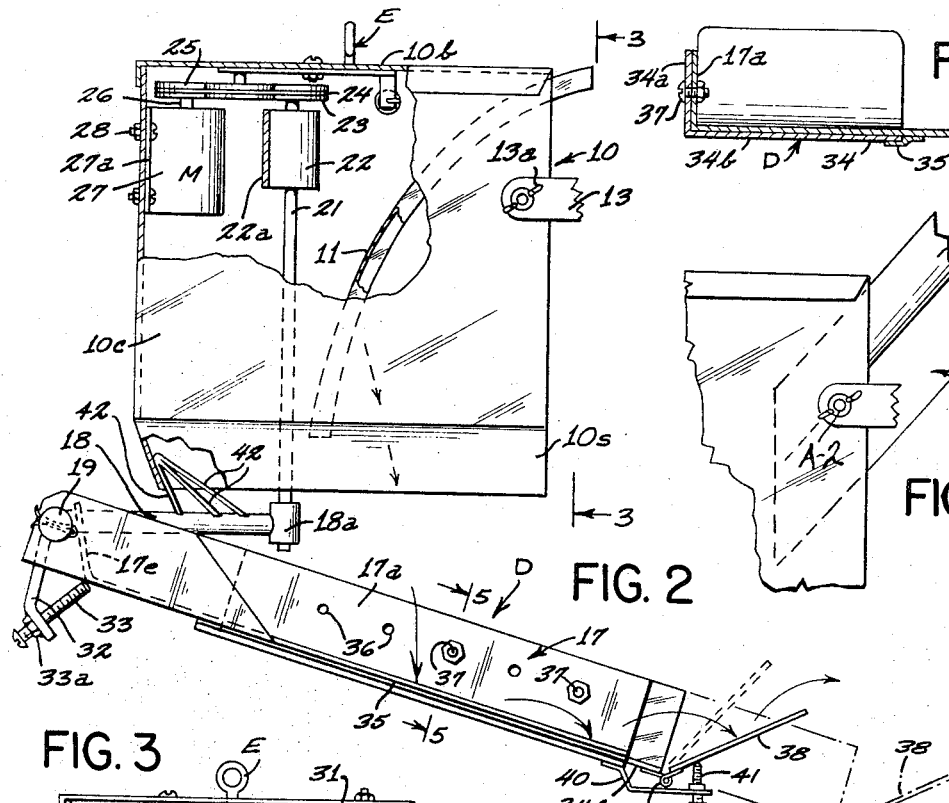
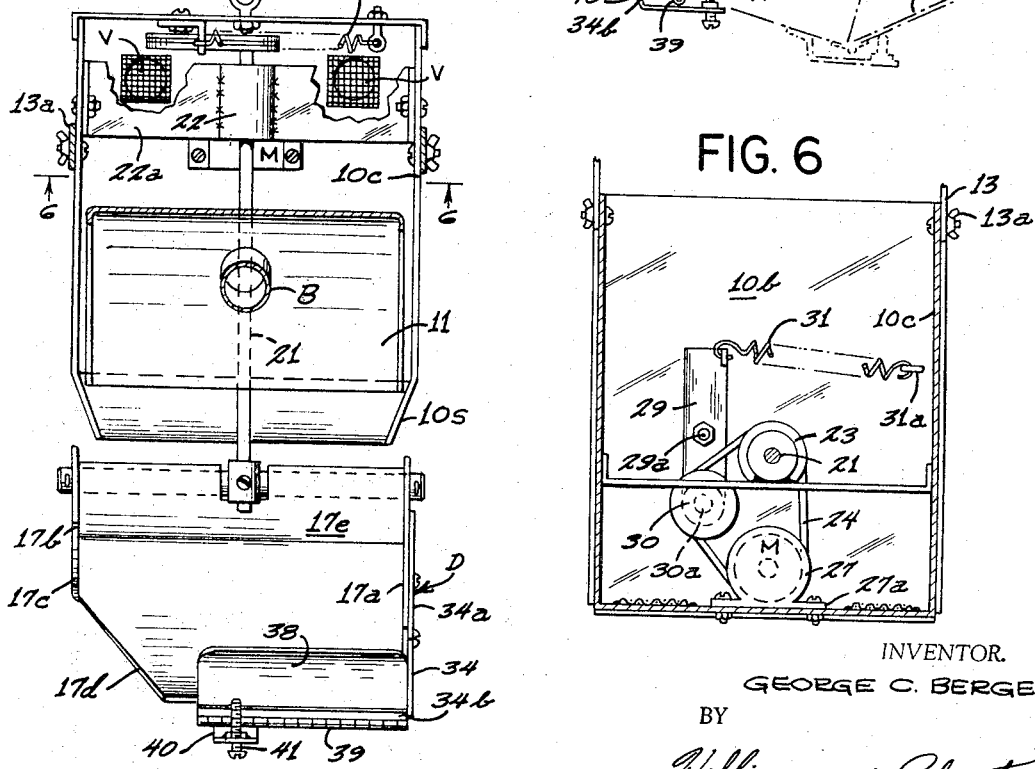
INVENTOR.
GEORGE C. BERGER
BY
Williamson & Palmatier
ATTORNEYS

United States Patent Office 3,349,929
Patented Oct. 31, 1967

3,349,929
SILAGE DISTRIBUTOR
George C. Berger, Erskine, Minn. 56535
Filed Oct. 22, 1965, Ser. No. 501,336
4 Claims. (Cl. 214—17)

ABSTRACT OF THE DISCLOSURE

A distributor assembly for attachment to the top of a silo or other tank or bin, for causing uniform distribution of silage or the like into the bin throughout the full height thereof. The invention is characterized by an elongate distributor unit of pan formation, having a declined bottom and mounted for revolution on a vertical axis substantially concentric with the vertical axis of the bin or silo. Means for mounting the distributor unit are essential at the top of the bin, said means including a depending, vertical, driven shaft terminating well above the declined bottom of the pan unit. The distributor unit also has an upward and inward receiving portion of substantial width to receive all silage or other material from a spout or other supply source external of the bin and this receiving portion has a lower and outward portion decreasing in width from the receiving portion. The distributor unit, at one longitudinal side thereof, has an upstanding flange and at at least a substantial portion of its opposite longitudinal edge, has an inclined, substantially planar margin from which material will disperse and drop during revolution of said distributor unit in a direction where the flanged edge constitutes the trailing edge.

Other features of the invention are the inclusion of a longitudinally adjustable auxiliary pan section slidably mounted on the main section, and also means or mechanism connected with the distributor mounting means for varying and adjusting the general angulation of the distributor unit relative to the vertical.

---

This invention relates to a distributor assembly for attachment to the top of a silo or other large cylindrical tank or bin, to assure uniform distribution of silage or the like into said bin throughout the full height thereof.

Silage and other similar feeds are commonly distributed into silos through the discharge of a blower tube or other type of mechanical elevator having a spout disposed radially inwardly and sometimes downwardly of the silo. Without additional facilities the discharge material will heap up at a point directly below the opening of the spout or at one side thereof, concentrating bulk density in the core portion of the accumulating material. Because of such uneven distribution, it has often been necessary in the past to employ one or two workers with shovels in the silo or bin, to move silage and grain around while it is being poured. Such work is exceedingly obnoxious because of dust and heat conditions.

In recent years certain revolving distributors have been devised and patented which employ elements revolving on a vertical axis. Some of these devices have supported axis of the revolving distributor substantially concentric with the axis of the bin or silo wherein feed, grain and the like is to be received. The prior art which is known to me however, while in some instances being successful for uniform distribution of cereal grain and relatively hard particulate material, have been unsuccessful for uniformly distributing, in silos and the like which vary in diameter, sticky material such as the several materials which constitute silage. The structure disclosed in Donelson Patent 2,980,009 is representative of several prior art devices which employ a multi-vane distributor element receiving falling material from the central top portion of the bin or silo. With all such prior art devices known to me, the difficulty has been that because of the sticky nature of silage and the constructions which involve a number of horizontally disposed elements, such horizontally disposed elements accumulate sticky silage eventually causing obstruction and improper distribution of silage material.

Other patents such as Anfinson 3,079,017 and Teisberg 2,040,506 employ rotary distributor elements having troughs inclined from the vertical and provided with vane surfaces contacted by the dropping material to produce attendant revolution of the distributor element without positive driving means. Here again, within a predetermined radius of silo tank, fair success may be obtained when the material consists in relatively hard, slippery cereal grain or other feeds, but because of the great variance in particle size, the very sticky nature of silage and the substantial differential in the dropping mass and shape and weight factors, unsatisfactory results have been found insofar as distribution of silage is concerned.

It is an object of my present invention to provide a simple, positively driven and highly efficient distributor unit, particularly adapted for silage and other sticky materials, which will have no parts which may become encumbered with adhering silage to obstruct proper and uniform distribution of the material throughout the entire cross sectional area of the silo or bin.

It is a further object to provide an efficient powered device of the class described, wherein equally successful results may be obtained in uniform distribution of silage in silos and other cylindrical bins, which vary widely in diameter and in height.

More specifically it is an object to provide a silage distributor assembly readily applicable to silos and other bins, and readily attachable in operative position therein, and which has provision for ready adjustment in the maximum dropoff point of a revolving distributor element axially mounted within the silo with regulation of tip speed of the distributor element so that uniform distribution may be assured of the sticky materials including silage, without regard to the diameter or height of the silo when proper adjustment is made.

These and other objects and advantages of my invention will more readily appear from the following description made in connection with the accompanying drawings, wherein like reference characters refer to similar parts throughout the several views and in which:

FIG. 2 is a view mostly in side elevation on a larger scale but similar to the view of FIG. 1 of my distributor device detached, and having parts thereof broken away and others shown in section;

FIG. 3 is an end or front elevational view of the distributor unit taken substantially along the line 3—3 of FIG. 2 with some parts broken away;

FIG. 4 is a fragmentary side elevation showing an alternate form of guide and deflector for entering silage applied to the forward opening of the distributor housing;

FIG. 5 is a cross section taken on the line 5—5 of FIG. 2, showing the slidable relation between adjustable sections of the distributor trough;

FIG. 6 is a cross section taken horizontally along the line 6—6 of FIG. 3, looking in the direction of the arrows.

Figure 1:
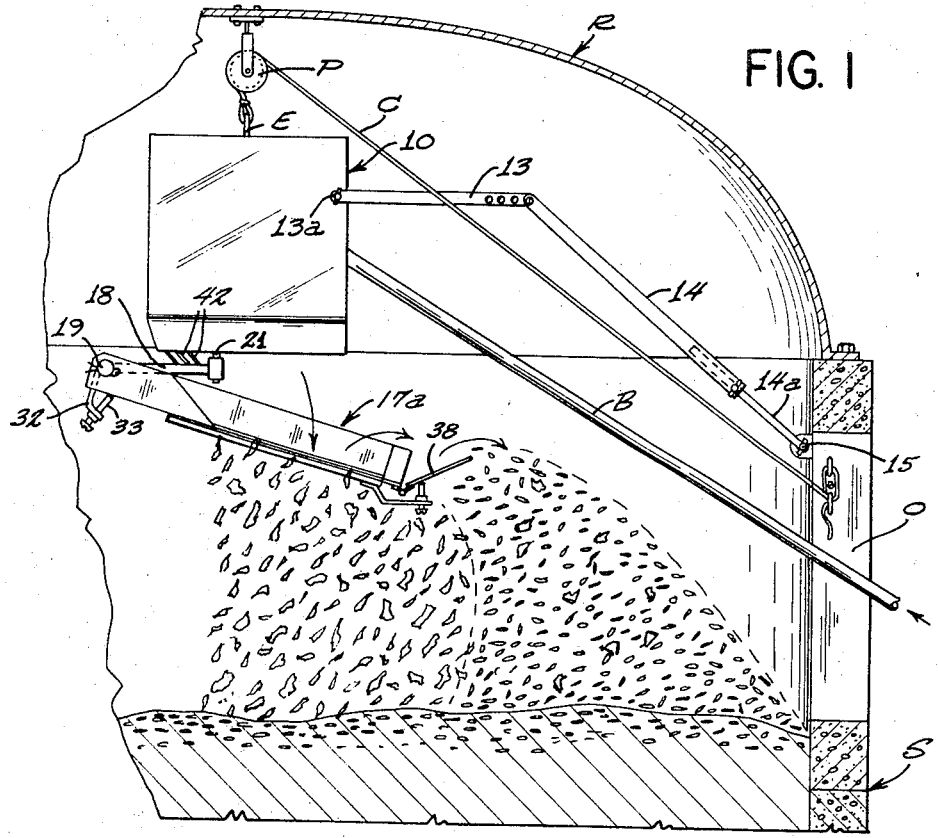
FIG. 1 is a longitudinal vertical section taken through a conventional type of silo having an embodiment of my silage distributor mounted therein and, for the most part, shown in side elevation.

Referring now to the exemplary form of my invention illustrated in the accompanying drawings, the assembly is shown in FIG. 1 as operatively mounted within a conventional type silo S having a door opening O of conventional type, and a detachable domed roof R.

My distributor assembly includes a compact housing 10 of generally rectangular shape, having a rear wall 10a, a top wall 10b and a pair of parallel side walls 10c. The front of housing 10 is open, as clearly shown in FIGS. 3 and 6, to receive delivery from a silage feed-in medium such as the delivery end of a conventional blower spout B having its forward end disposed within side walls 10c of housing 10. A guide and deflector 11 for entering material is provided for preventing any of such material from entering the rear and upper portion of housing 10 which as shown, consists in a substantially arcuately curved, shallow channel member (see FIG. 2) having side flanges which are detachably secured at spaced points by bolts or the like to the side walls 10c of the housing. This stationary deflector guides all entering material downwardly and protects important inner mechanisms and parts including a depending shaft 21 from impingement or contact of the silage material.

In some instances silage is elevated by means other than a spout and here the deflector 11 may be detached and as shown in FIG. 4, an inverted trough A having a concavo convex top portion A–1 may be adjusted to, by clamps A–2, assure direction of material downwardly.

The housing 10 is in main supported from the center of the dome or upper end of the roof R of the silo and as shown, has a heavy supporting eye E affixed to a reinforced portion of the top 10b of the housing. This eye may be connected by a cable or other means to the top of the dome of roof R or as shown, it may be adjustably supported by means of a cable C which is affixed at its far end to the eye E and runs over a pulley P affixed to the top of the dome, the free end or bight of the cable extending to the open doorway O and secured as by heavy cleat or otherwise in an upwardly adjusted position.

It is desirable to stabilize the assembly housing 10 by suitable means to prevent it from twisting or shifting when the device is in operation. While any suitable means may be employed for such stabilization and anchorage, as shown I provide a hanger structure mounted for wide adjustment, comprising an upper pair of interconnected pipes or the equivalent 13, having pivotal connection at their outer ends with the side walls 10c of the housing 10, and preferably having winged nuts 13a for clamping action therewith in an adjusted position. The inner ends of the pipes 13 of the hanger structure as shown, are provided each with a plurality of apertures therethrough, through which may be connected a second pair of hanger pipes or the equivalent 14, which may be angled as desired with reference to pipes 13 and which as shown, have telescoped, slidably adjusted terminal rods or shanks 14a for securing at their outer ends and clamping arrangement with brackets 15 detachably mounted in the doorway opening O.

I have discovered that it is extremely important to cause a direct flow of the silage or other feed material of sticky nature to be ultimately distributed directly downwardly into the main revolving distributor element. If this is not done, sticky material in particulate form and varying widely in shape, size and weight factors, will adhere to parts of the overall unit, massing up in time as operation continues, until clogging or objectionable distribution is almost certain to follow. Thus, with my structure and the open housing 10, with the deflector trough 11 adjustable widely in angulation, all material must push off of the inner end of the deflector trough 11 and fall downwardly, as indicated by the arrows in FIG. 2, without touching the sides or any walls of housing 10.

Figure 7:
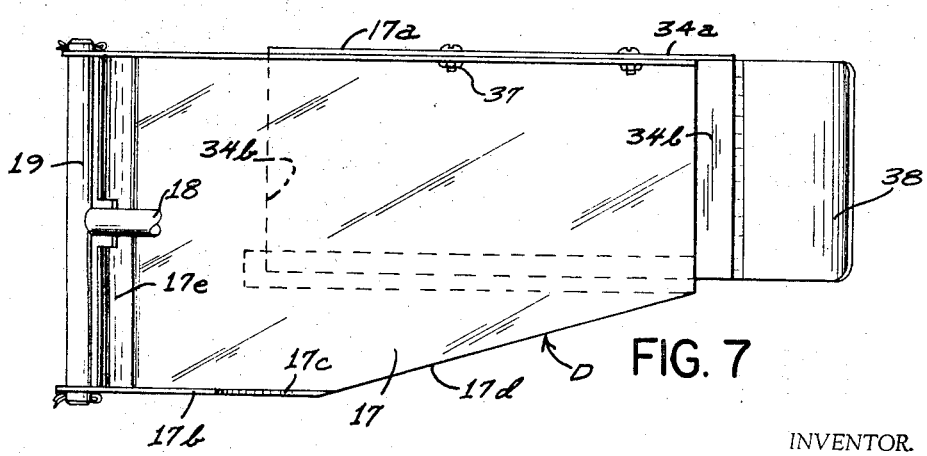
FIG. 7 is a top plan view of a satisfactory structure of my distributor pan detached from the assembled device.

The preferred embodiment of my distributor element which is revolved on an axis coincident with the vertical center line of the silo, is shown in the accompanying drawings, comprising in essence, an elongated distributor trough designated as an entirety by the letter D, which has provision for a number of different adjustments to assure efficient distribution of silage and other materials uniformly throughout the cross sectional area of silos, and other cylindrical bins which vary quite substantially in diameter and height. The distributor element or trough D has a main pan section 17 provided at one of its longitudinal and straight edges with an upstanding, substantially vertical flange 17a of several inches in width, which acts as a retaining flange for the material falling upon the distributor element D. The opposite longitudinal edge of the pan 17, as best shown in FIG. 7, at its end disposed most inwardly of the silo has a straight flange 17b which diagonals downwardly at a section 17c until the side edge merges with a straight, elongated edge 17d at the bottom of the pan. Thus, the flange portions 17b and 17c in the revolution of the distributor D, prevent flow or dropping of the material from the pan while the elongated edge 17d which defines the edge at a portion of the bottom of the pan permits material to be dropped therefrom and distributed in the revolution of the distributor element.

As shown, my important distributor trough D is supported with angular adjustment relative to the vertical by a horizontal arm or sleeve 18 constructed of rigid metal and having its outer end welded or otherwise rigidly affixed to a heavy horizontal cross head 19, which bridges the two side walls or flanges 17a and 17b of the pan, and is rotatably affixed to the said flanges as well as preferably to additional reinforcements.

The horizontal supporting arm 18 at its inner end, carries a perpendicular heavy sleeve member 18a which for a considerable area surrounds and is solidly affixed by heavy set screw to the lower end of depending driven shaft 21 which at its upper end is mounted in suitable thrust bearings 22. The said thrust bearings are preferably attached and supported from both the top of the housing 10b and a transversely disposed partition 22a which has a central portion generally encircling the bearing 22, and has terminal portions interconnected with the side walls 10c of the housing. The upper end of shaft 21 extends through the housing and structure of the thrust bearing 22 and carries a driven pulley 23 (as shown, a belt pulley), about which is trained a triangularly arranged driving belt 24 which is driven from a relatively small driving pulley 25 affixed to the upper end of a vertically disposed take-off shaft 26 which is connected by suitable variable speed transmission with a vertically disposed electric motor M having a suitable housing 27, having provision longitudinally thereof for ventilation of the motor, and said housing as shown having outturned attachment flanges 27a which are rigidly clamped at both sides of the motor through the medium of clamping nuts 28 or the equivalent, to the rear vertical wall 10c of housing 10. Motor M is adapted through transmission mechanism of conventional nature (not shown) to drive at greatly reduced speed, the shaft 21 through the driving belt 24. The variable speed transmission mechanism (not shown) is enclosed within the upper portion of the housing for the motor M. A belt-tightening mechanism is provided for the driving connections between pulleys 23 and 25, which as shown in FIG. 6, consists in a tensioning arm 29 pivoted to the top wall 10b of the housing by bolt 29a, and having at its rear end an idler pulley 30 about which the driving belt 24 is trained. Pulley 30 and its supporting pin 30a is urged outwardly to always tighten belt 24 by, as shown, a coil spring 31 affixed at one end to a bolt 31a and having its opposite end connected with the forward end of the tensioning arm 29.

Referring now to the several very important adjustments of the distributor trough or pan designated as an entirety by the letter D, it will first be noted that the entire structure may be angularly adjusted relative to its supporting bar 18 by suitable means positioned adjacent the pivotal connection at the inner end of assembly D with the heavy cross head shaft 19. As shown, the cross head 19 is provided with a depending, centrally and rigidly attached arm 32 which is angled inwardly at its lower end and carries perpendicularly thereto, an adjustable abutment screw 33 threadedly received in the angled end and provided with a lock nut 33a. The upper end of this arm is adapted to abut the bottom of the main trough section 17 thereby determining its lengthwise angular relationship to the horizontal heavy supporting arm 18.

The main section 17 of the distributor trough or pan has slidably connected therewith an auxiliary longitudinal trough or pan 34 (see particularly FIGS. 2, 3 and 7) which has a vertical longitudinal flange 34a and an elongated rectangular flat bottom 34b. Bottom 34b underlines the bottom of the main trough or pan 17 and is guided for sliding movement longitudinally of the assembly by a channel track 35 which engages the marginal, longitudinal edge of the pan section 34. Thus, by slidable adjustment the pan section 34 may be forwardly projected from the position shown in full lines in the drawings to a plurality of different projected positions including that shown in dotted lines in FIG. 2, and to positions even more extended. Means are provided such as a plurality of spaced apertures 36 formed in the upturned flange 17a of the main pan section for receiving at least a pair of securing bolts 37 which pass through both flange 17 and the overlying flange 34a of the auxiliary pan section 34.

In addition to the several component parts of the overall distributor trough or pan D, I prefer to provide an outermost swingably adjustable "drop-off" lip 38 of rectangular shape having its inner edge hinged by hinge members 39 to the forward edge of the auxiliary pan bottom 34b. This "drop-off" lip may be angularly adjusted from a position co-planar with the bottom of the main pan 17 to an upwardly angled position shown in dotted lines in FIG. 2 through suitable mechanism. The mechanism as shown, comprises a rigid offset bar 40 affixed medially to the bottom side of pan bottom 34b, having an outer end which projects below a central portion of the lip 38 and which as shown, carries an abutment screw 41 which by adjustment determines the angulated position of the "drop-off" lip.

A very important feature of my overall distributor unit is that silage is taken in through an open end portion of an inverted housing whereby all driving means, motor reduction gears, etc., are enclosed on top and at two sides of the overall structure, making in combination with the silage feed-in substantially impossible for silage to contact or get into any of the drive elements, motor or main working parts.

Further, my structure most advantageously supports the overall distributor trough or plan, to prevent any accumulation of the sticky material such as silage on the supporting parts. Only a portion of the horizontal, heavy supporting bar 18 is in any way subjected to contact with downwardly dropping silage in the revolution of shaft 21 and the rigid arm 18 affixed to the lower end thereof. To positively prevent accumulation of sticky material on said arm 18, I provide two or more depending spring rods 42, which wipe the top of the horizontal arm 18 during the revolution thereof in its orbit.

The width of the inner and upper receiving end of the overall distributor trough or pan is greater than the width and depth of the housing 10, as will be seen from FIG. 3, whereby substantially all dropping particulate material such as silage will fall upon the inner portion of the width of the distributor. Furthermore, the open front housing 10 has a downwardly converging skirt 10s which is of assistance in concentrating the dropping and delivery of all entering material upon the upper and broad inner end of the distributor trough assembly.

The center of gravity of the revolving overall distributor pan structure, because of the widened upper and inner receiving end thereof and the weight of horizontal supporting bar 18, and the heavy cross head bar 19, is substantially below the axis of the vertical driven shaft 21. This shaft, it will be seen, extends perpendicularly to the general orbit generated by the revolution of the overall distributor trough D in its operation.

OPERATION

The assembly is supported and mounted at the top of the circumferential, cylindrical wall of a silo or other storage bin as previously recited, and the stabilizing hanger structure consisting in the two sets of pivoted arms, pipes or the like 13 and 14, or equivalent structure, is secured in the open doorway O near the top of the silo. It is essential that the driven main supporting shaft 21 be disposed coaxially of the vertical center line of the bin or silo, or at least close to a concentric position.

Thereafter before operation the appropriate adjustments are made in the angularity to the vertical and in the length of the overall distributor pan unit, keeping in mind the internal diameter of the silo or bin, the flowability or viscosity of the silage or other material to be stored, and also the discharge rate from blower or other elevating medium of the silage material.

If the silage material is to be discharged rather rapidly and is of sticky nature, the overall angulation of the distributor pan structure to the vertical is increased from that shown in FIG. 2. If, on the other hand, the material is not particularly sticky and has fair flowability, the distributor pan D is adjusted more nearly to the horizontal.

The overall length of the distributor pan unit may be adjusted properly for the diameter of the silo or other bin to be filled, bearing in mind that the diameter of silos range from 12 to more than 24 feet.

Driven shaft 21 is of course revolved directionally so that the unflanged, longitudinal edge 17d is the leading edge, and the flanged edge 17a of the main pan with the flanged edge 34a of the auxiliary pan, constitute the trailing edge of the overall distributor pan in revolution.

The r.p.m. of the important driven shaft 21 may be quickly adjusted within limits prescribed, by the transmission mechanism (not shown) of variable speed, with appropriate indices to obtain the desired driving speed on the overall distributor. In any event, the r.p.m. of shaft 25, taking into consideration the desired angular adjustability and longitudinal adjustability of the pan, should be such that the silage or other material dropping off or thrown off from the overall distributor pan unit should be at least equal to the volumetric intake of the entering silage material guided by the deflecting intake pan 11. I have found that taking into consideration various internal diameters of silos and bins, the driven speed of the overall distributor pan may vary from 25 r.p.m. to 40 r.p.m.

The operation and advantage of the angularly adjustable drop-off lip 38 while not an essential element of my overall combination, is preferable to give greater variability to my distributor assembly for taking care of a great variety of feed materials, some of which have good flowability and low viscosity as distinguished from sticky materials including silage. Thus, if the material being distributed has good flowability, then the drop-off lip 38 may be upwardly adjusted at its free end to prevent excessive discharge of the material from the end of the distributor unit.

Since the bottom of the sectional distributor pan is declined from the horizontal, from its receiving end to its outer end, and since the distributor unit is revolved with the unflanged marginal edge forwardmost, as the leading edge, substantial material will flow from the widened receiving portion of the main pan 17 downwardly while a considerable portion of the flowing material at the narrowed portion of the main pan and over the rather narrow bottom of auxiliary pan 34, disperses laterally and drops downwardly bringing about, with proper adjustment of the angulation of the pan for the type of silage or other material being distributed, a substantially uniform particle distribution throughout the cylindrical interior of the silo (see FIG. 1). Centrifugal force is of course a factor also in the downward and divergent movement of the particular material.

The upstanding flange 17d of the main pan section and the flange 34a of the narrower pan section, guide material downwardly longitudinally of the pan and prevent drop-off of material at the trailing edge of the distributor.

The arcuate deflector 11 protects shaft 21 and the motor, thrust bearings 22 and all driving elements between motor and shaft from contamination or impingement by and from entering material. The housing 10 protects the inner working parts from entry of dust and the like. It will further be noted with my structure there is no obstruction, shaft or other element disposed in the downward travel of deflected material with the exception of the very short area of the support arm media for connection with external (as shown, the rear and upper end) of the distributor unit. This small area of the support arm structure is continuously brushed during revolution of the support arm.

From the foregoing description it will be apparent that I have provided a simple, compact and widely adjustable distributor assembly capable of manufacture at low cost and assuring, in operation for silos and other vertical bins, a uniform distribution of materials varying substantially in particle size, shape and weight, and flowability. The foregoing is true with proper adjustability of my unit, regardless of the diameter and height.

It will of course be understood that various changes may be made in the details, shape, arrangement of parts and substitution of equivalent elements for those disclosed, all without departure from my invention. In this connection it will of course be understood that in substitution for the single heavy counterbalancing support arm 18, a bridging arm structure could be substituted where the ends of a pair of outwardly extending arms connect with the medial portion of the exterior of the overall distributor unit at areas or points beyond the confines and circumference of the housing.

What is claimed is:

1. An assembly for uniformly distributing silage and the like into vertical bins such as silos, having in combination
    an elongate distributor unit of pan formation having a declined bottom and mounted for revolution on a vertical axis,
    means for mounting said distributor unit at the top of a vertical bin such as a silo with the axis of revolution thereof substantially coincident with the vertical center line of said bin,
    said means including a depending vertical driven shaft terminating well above said declined bottom and a supporting arm medium affixed to the lower portion of said shaft and connected to the exterior portion of said distributor unit,
    said distributor unit having an upward and inward receiving portion of substantial width for receiving all silage or other material from a supply source external of said bin, and having a lower and outward portion decreasing in width from said receiving portion,
    means for deflecting and guiding entering supply source material to assure flow and reception of substantially all thereof during the revolution of said distributor unit upon said widened receiving end,
    said distributor unit at one longitudinal side thereof having an upstanding flange and at at least a substantial portion of its opposite longitudinal edge having an inclined, substantially planar margin from which material will disperse and drop during revolution of said distributor unit in a direction where said flanged edge constitutes the trailing edge.

2. The structure set forth in claim 1 further characterized,
    by said distributor unit having a main pan unit which includes said receiving portion and a longitudinally adjustable auxiliary pan section slidably mounted on said main section and longitudinally adjustable thereof,
    and means for securing said units together in a plurality of different adjusted positions.

3. The structure set forth in claim 1, and
    mechanism connected with said distributor mounting means for varying and adjusting the general angulation of said distributor unit relatively to the vertical.

4. The structure set forth in claim 1, and
    angularly adjustable drop-off means hingedly connected with the outer and lower end of said distributor unit and adjustable from a position substantially planar with the outer declined end of said unit proper to an angulation relative thereto of at least 45 degrees.

References Cited

UNITED STATES PATENTS

| | | | |
|---|---|---|---|
| 2,497,406 | 2/1950 | Graham | 214—17 |
| 2,652,288 | 9/1953 | Sands | 302—60 |
| 2,961,245 | 11/1960 | Romeiser | 275—15 |
| 3,248,117 | 4/1966 | Donelson | 214—17 X |
| 3,282,591 | 11/1966 | Donelson | 214—17 X |

ROBERT G. SHERIDAN, *Primary Examiner.*